June 5, 1956
E. MONTI ET AL
2,748,739
UNDERWATER STORAGE VESSEL FOR FLUID
EXPLOSIVES AND COMBUSTIBLES
Filed Oct. 12, 1951
2 Sheets-Sheet 2
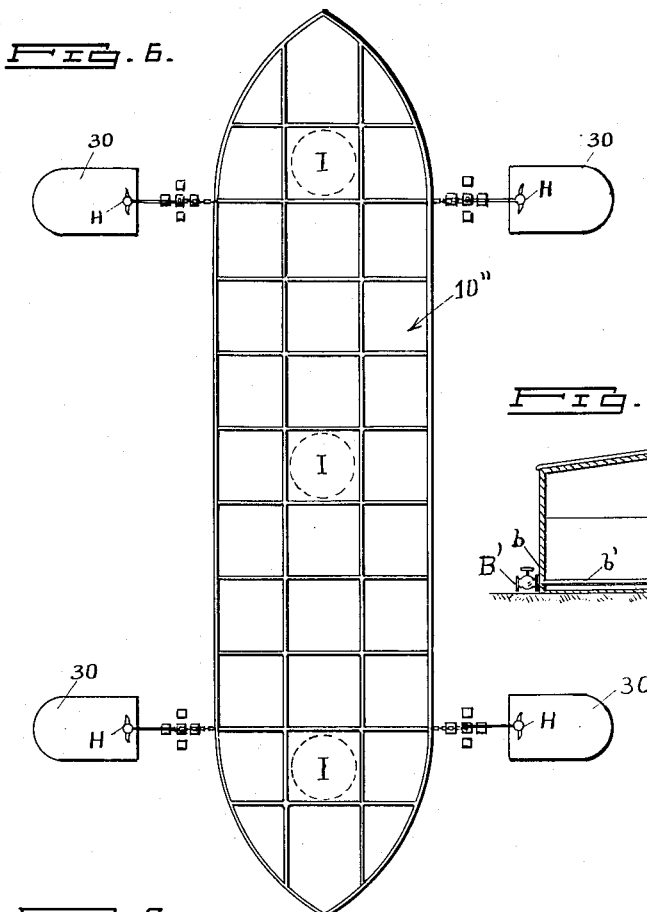
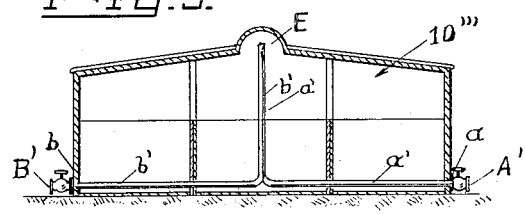
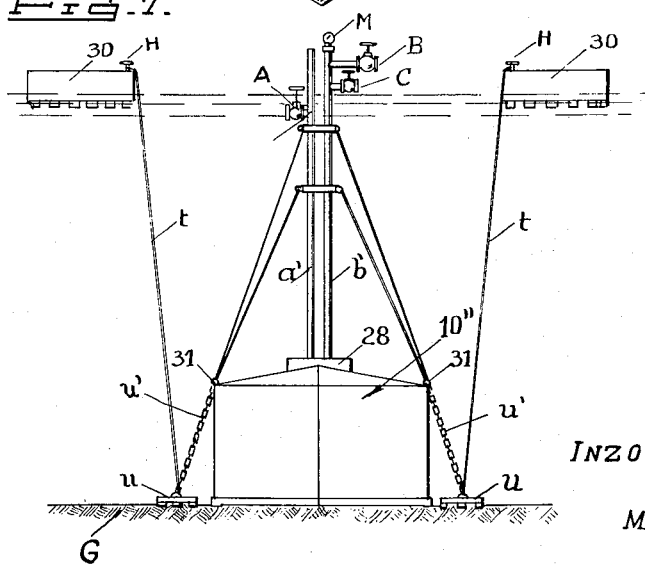
INVENTOR.
INZO MONTI & LUIGI GALLINGANI.
BY
MAXWELL E. SPARROW.
ATTORNEY.

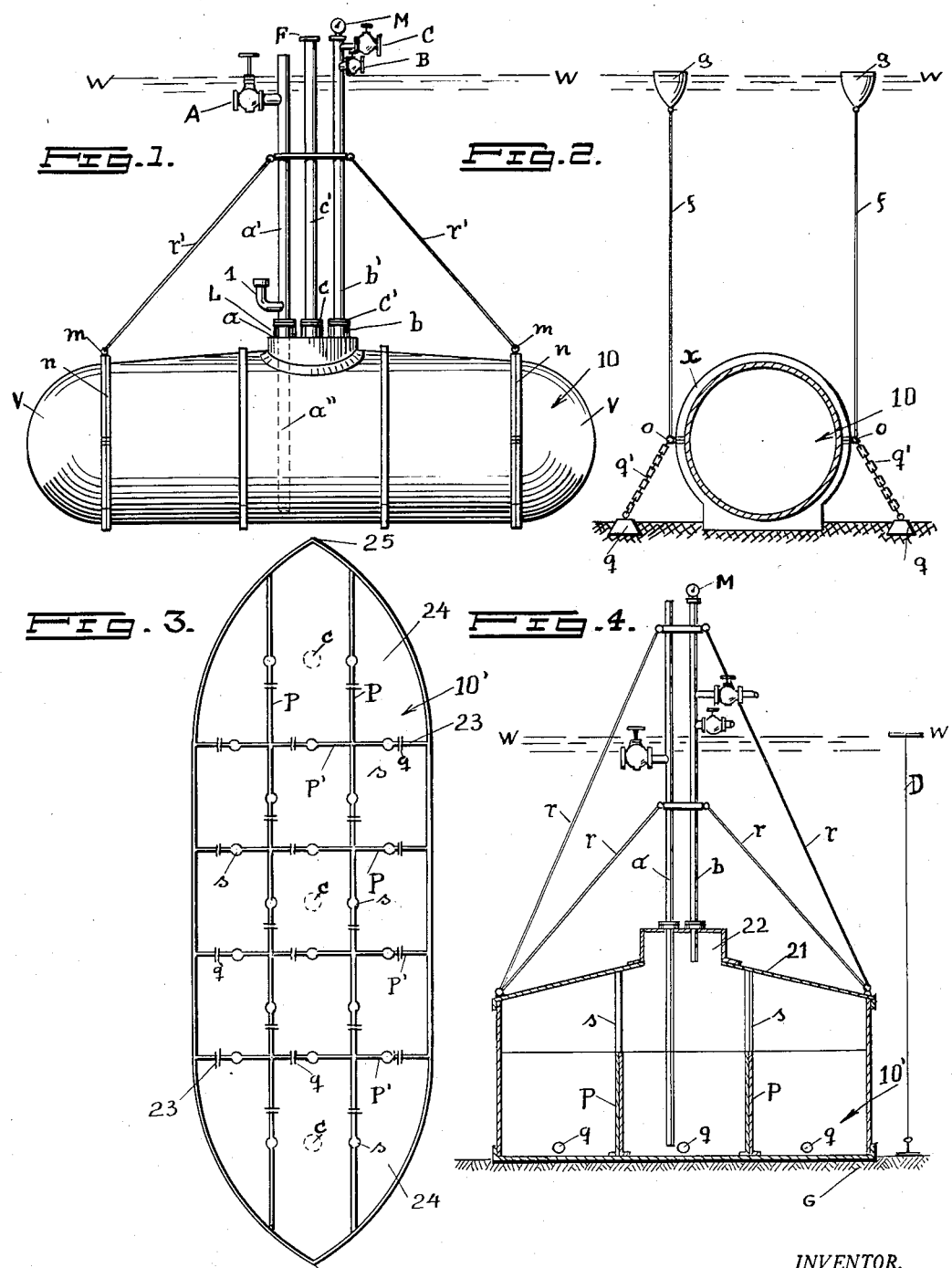

United States Patent Office 2,748,739
Patented June 5, 1956

---

2,748,739

UNDERWATER STORAGE VESSEL FOR FLUID EXPLOSIVES AND COMBUSTIBLES

Enzo Monti, Bologna, and Luigi Gallingani, Lavagna, Italy

Application October 12, 1951, Serial No. 250,994

3 Claims. (Cl. 114—.5)

---

This invention relates to the under water storing, in a sealed floating and submersible tank or vessel of concrete, fluid or liquid having a specific gravity smaller than that of water and being substantially immiscible with water, and in which the tank is floated on a body of water, towed to a point of submersion and thereafter partially filled with water sufficient to compensate for the major portion of the buoyancy of the tank and then submerged to rest upon the bottom of the body of water while compressed air is simultaneously introduced on the interior of the tank to compensate for increased pressure to which the tank is subjected upon submersion, the said liquid being subsequently forcibly introduced into the tank above the level of the water therein, whereby liquid is stored releasably under pressure on the interior of the tank.

It is an object of the present invention to provide an underwater storage tank or vessel for the conservation of fluid explosives, inflammables and combustibles, capable of being submerged in a protective liquid of a greater specific gravity than the fluid and which is incombustible, unchangeable and immiscible with the conserved liquid or fluid.

It is a further object of the present invention to provide an underwater storage tank or vessel that comprises a sealed enclosure structure made of concrete, the structure being floatable as well as submersible and being arranged to receive water as well as fluid or liquid to be stored, in contact, superposed therein, and also pressurized air.

Yet another object of the present invention is to construct said concrete structure such that it is elongated horizontally and has a roof section tapered downwardly conically from a central top portion with an apertured raised part above the top portion, ground engaging means for support of the structure at rest on the bottom of a body of water, and conduit means connected to the structure and extending from the interior to the outside thereof, which conduit means includes hollow tubular elements extending upwardly from said structure beyond the level of the body of water surrounding the structure and operable to pass water, liquid and air.

A still further object of the present invention is to provide in an underwater storage tank or vessel for fluids or liquids, of the character above mentioned, valve means operable for the passage of fluids including pressurized air and said liquid and water, operable to control and to vary the ratio of water, liquid and air, and the pressure, on the interior of said structure of vessel or tank, the valve means having some elements for passage of air and of the liquid disposed above said level and, respectively, other elements for water passage below said level; and vertical perforated partitions disposed on the interior of the tank structure defining a series of intercommunicating storage chambers for water and liquid or fluid to be stored above the water and operable to restrain agitation of the water and liquid in said structure.

The aforementioned vessels or tanks may be anchored or simply deposited on the bottom or bed of the desired underwater place. The anchorage is necessary only in case that the proper weight of the tank together with the weight of the contents, is not sufficient to overcome conveniently the hydrostatic buoyancy or if in the event of strong submarine currents, such as to overcome the weight with which the tank reposes on the bottom and in a way to displace it from its position of service.

In the drawings:

Fig. 1 is a longitudinal view of a vessel or tank according to the invention;

Fig. 2 is a transverse section of Fig. 1;

Fig. 3 is a top plan view of the interior of a vessel or tank according to the invention in a modified form;

Fig. 4 is a transverse sectional view of the vessel or tank depicted in Fig. 3;

Fig. 5 is a transverse sectional view of a vessel or tank according to the invention in a still further modified form;

Fig. 6 is a top plan view of the interior of the vessel or tank seen in Fig. 7; and Fig. 7 is an end view of a vessel or tank according to the invention in yet a further modified form.

Referring now more particularly to the drawings, and first specifically to Figs. 1 and 2, which disclose a tank 10 adapted to contain small quantities of the liquid or fluid to be stored in a relatively small place in tranquil water; the body of the vessel or tank is constructed in substantially U-shaped form, almost cylindrical closed by two semi-spheres V. This tank is placed at the bottom of the body of water, and secured in desired position.

The upper part of tank 10 is inclined towards the center such as to facilitate the discharge of the liquid or fluid from the tube $b'$ explained below and in order to hinder the formation of air pockets. In the center of the main part is a hermetically sealed inspection door to which are hermetically fixed three tubular joints, $a$, $b$, $c$. At the joint $a$ are fixed two tubes, namely, $a''$ in the interior of tank 10 and which projects or extends to a point in proximity of the bottom of the tank, and $a'$ projecting outwardly and open at the top; the latter tube may be vertical, inclined, rigid or flexible, and must be of sufficient length to reach outside the free surface W—W. The joint $a$ having the flange L connects with the tube $a'$, the joint $b$ connects with the tube $b'$ and the joint $c$ connects with the tube $c'$. All of these tubes project above the surface W—W of the water and may be rigid or flexible, vertical or inclined or bent. These tubes may also be fixed to the tank 10 by means of steel ropes $r'$ hooked to the bands $n$ through the rings $m$. A slide valve A is fixed at the tube $a'$ a little below the surface W—W of the water. Slide valves B and C are fixed to the tube $b'$ above the surface W—W of the water, and at the top of tube $b'$ is placed a manometer M. The top of tube $c'$ is higher than the valve B and can be closed by a cap F. Tank 10 is provided with rings $o$, which serve to fix the anchors $q$ through the chains $q'$. Buoys $g$ having the standards $f$ are connected to the rings $o$ on the bands $x$ to position and locate the tank. The tank is secured to the anchors by the chains $q'$.

Referring to Figs. 3 and 4, there is disclosed a tank or vessel 10' of greater capacity than the tank disclosed in Figs. 1 and 2, for example a tank of 2500 cm. This tank is adapted to be submerged in a little agitated river, lake or sea, at a desired depth. The bottom of tank 10' has a level surface in order to conform to the bottom G of the body of water, and may be levelled horizontally by using gravel, earth or other suitable means. The covering 21 of the bridge 22 instead of being square is provided with a level section 23, a curved section 24 raised towards the center 25 of tank 10', in transverse direction, to facilitate the feeding of the fluid or liquid (which may be combustibles) at the receiving tower 22, which is positioned at the center of the tank.

The relation between the principal dimensions of the tank, that is, length, width, height, may be established in the same manner as that of a floating vessel. In the interior of the tank are provided one or more perforated longitudinal partitions P and transverse partitions P'. In Fig. 3 is seen two longitudinal partitions and four transverse partitions, but it is understood that this number is arbitrary and there may be as many of these longitudinal and transverse partitions as may be desired; also their positions may be varied. These partitions are connected to the bottom of the tank, and are preferably about two-thirds of the height of the interior of the tank, and are united by columns $s$, the number and position of which are to be established in accordance with the particular tank designed. The columns $s$ are anchored to the bottom of the tank and project above the partitions to the top thereof. The partitions P are arranged between the holes $q$. The number of sections of the tank will be proportional to the number of tubes used for charging and discharging the tank 10'.

The partitions serve as baffles or walls for the liquid cargo during maneuvers of submersion and return to floating position of the tank by application of water ballast.

The tank or vessel depicted in Figs. 3 and 4 is preferably constructed at the dockyard and launched as a vessel to be towed to her place of service and be positioned there at the bottom of the body of water. The weight of the cargo will be distributed in the various parts of the tank's structure to allow perfect stability during towage. This tank conforms with its proper weight to the required stability on the ground, in each phase of its service; it does not require any special anchorage or further ballast to remain at the bottom of the place of submersion in its established position, and will resist the action of the most intense submarine currents. The service tubes $a$ and $b$ are similar to those disclosed in Figs. 1 and 2 with the exception that the joint $c$ and the tube $c'$ are eliminated. The small tower or bridge 22 can be formed as a dome of reinforced concrete or cast iron.

Fig. 5 represents in transverse section a tank or vessel 10''' of capacity greater than that represented in Figs. 3 and 4, and which differs from the latter only by the disposition of the service tubes and which is employed in cases where the tank has to be positioned or located in places of agitated waters, or at great depth, and, also, if it is desired to leave the water above the submerged tank free of obstruction and for navigation. The tube $b'$ which is utilized for the charging and discharging of the combustible fluid is separated from the interior of the dome E, preferably a few centimeters below its top, and descends vertically and horizontally as far as the bottom of the tank 10''' and parallel therewith. Externally of tube $b'$ is applied the valve B' through joint $b$. To this valve is joined a set of bottom tubes (not shown) which will reach the bank where it will be connected for the charging and discharging of the combustible fluid. The joint $a$, for the entrance and discharge of the water is provided with the slide valve A'. Inspection doors I (Fig. 6) are provided in sufficient numbers for the purpose, in the covering bridge 28 (Fig. 7) of tank 10''. In the construction disclosed in Figs. 6 and 7, winches H are provided on auxiliary floating crafts 30 disposed alongside tank or vessel 10''. These floating crafts 30 are conveniently anchored. The winches H will act on the tie rods $t$ of tackles comprising steel ropes, the tackles acting between the fastening rings 31 of the tank 10'' and the articulate body or chains $u'$, the weights $u$ conveniently calculated beforehand, being predisposed on the ground G at desired positions, such as to form a unique system of automatic compensation of the strains on the tackles with the oscillations of the tank and the auxiliary floating crafts 30.

The following suggests the manner of maneuvering and operating the tanks or vessels depicted in the drawings for immersion and putting them in floating position.

The tanks according to the design depicted in Figs. 1 and 2, being of small capacity can be constructed on land near the place where they have to be used and transported by conventional means to the water place of destination and lowered with a crane in the basin to be filled later on with water.

By taking off the flange L and opening the slide valve B, the tank can be lowered to quite a depth of water. If the tanks depicted in Figs. 1 to 5, inclusive, have to be placed instead in artificial basins which can be flooded after their construction, they can be constructed on land or dry dock and filled with water while the dock or basin is flooded, leaving open the slide valves A and B. When the tanks or vessels are to be of great dimensions and have to be submerged in places such as seas, lakes, rivers, etc., requiring much space and being of great weight, they must be constructed in yards, the same as ships, and launched and towed to the place of service and there submerged and maneuvered, to be effected during a calm sea. These maneuvers are executed by introducing into the tank, by means of the slide valve A, a quantity of water (taken from the place of submersion) to reduce to less than a few tons (to be determined according to the case at hand in relation to the manner of maneuverability, and the maneuvering means available) the buoyancy to the floating of the tank itself. The charge of water will be in volume less than the total useful capacity of the tank. The internal partitions P, P' of the tank, being greater in height than the level of the mentioned water taken in as ballast, will serve to hinder the rapid displacing of the said water from one compartment to the other which may be caused by oscillation of the immersed tank in water not altogether calm.

In the device depicted in Figs. 6 and 7, with the simultaneous action of the tackles, the gradual descent of the tank will be effected, regulating it as required to the place of service on the bottom or ground. During the descent of the tank, the increasing of the external pressure on the tank is compensated by applying compressed air to the interior of the tank, introduced through the slide valve C, while the slide valve B is kept closed. Regulation of the descent of the tank through control of the winches H, and at the same time introduction of the compressed air, will be accomplished in a way such as to bring about the desired result within the maximum limits of resistance of the structure of the tanks. It is desirable to regulate the descent of the tank at predetermined or preestablished intervals for the control of the pressure.

In the case of grounds having little depth, it will be possible to eliminate the use of air compressors, using instead pumps for the introduction of ballast water by means of the slide valve A, while the slide valve B is kept closed, so as to keep the compressed air already contained in the tank. In the case of greater depth, after this first compression, other compressed air will have to be introduced through the slide valve C, while the slide valves A and B are kept closed.

To return the tank to floating condition, the tank is emptied of the stored fluid, which may be a light combustible liquid, the slide valve A left open to pass later on water to the tank; (with the tackles in operation in considering Figs. 6 and 7), and compressed air introduced in order to eject water from the tank in order to lighten it to the extent of arriving at substantially a few tons of buoyancy to a predetermined floating condition. The slide valve A for the water is then closed and the tank will then commence to rise, slackening the tackles gradually and simultaneously and proportionally letting the compressed air out, in such a manner as to reduce the internal pressure to render it equal to the external pressure, or at least maintain the difference in the preestablished limits of resistance of the structure.

To fill the tank with the fluid or liquid to be conserved, the same is introduced through the tube $b'$ by means of a pump acting under such pressure as to eject the water through the slide valve A which is opened, while the fluid or liquid, being lighter collects in the upper part of the tank. In order to avoid (due to a strong pressure) the fluid or liquid arriving at the bottom of the tank and discharge through the tubes $a'$, $a''$ (as in Fig. 1) there is disposed a shutter 1 for the purpose of interrupting the jet of fluid or liquid. In the case of the tank depicted in Fig. 3, this shutter is not necessary owing to the height of the tank; nor is this shutter necessary in the construction shown in Fig. 5, since the jet of tube $b'$ is turned towards the water level.

The extraction of the liquid is effected by opening the two slide valves A and B and introducing external water by means of a pump through slide valve A and tube $a'$, $a''$.

Because of the difference of level between the water level surface W—W and the extreme interior of the tube $a''$, the lighter liquid will rise above the level W—W. The tube $c'$ of the construction shown in Fig. 1 is vertical and rigid and serves to measure the liquid contained in the tank. By introducing a sound device bespangled with reactive paste, the height of the occupied space of the liquid can be determined and then its volume determined by means of a special table experimentally arrived at for the purpose. For the procedure, it is necessary to lower first the water column in the tube $a'$. It will be sufficient for this purpose to close the valve A, and opening the valve B, let flow out a quantity of the fluid corresponding to the quantity of water which is discharged from the interior of the tank in relation to the difference of the specific weight between water and fluid. If the tank is located at great depth and is not provided with the tubes $c'$ (as in Figs. 3, 4 and 5), the height of the fluid will be measured on the free level W—W, valve A being open. Knowing the specific weight of the external water and that of the conserved fluid or liquid, the depth D and the temperature of the fluid, it is easy to calculate the height of the fluid conserved in the tank, and therefore its volume. The manometer M, placed at the top of the tube $b'$, indicating the pressure which the conserved fluid or liquid exercises on it, can serve to establish the said height.

Having thus described the invention, what is claimed as new and desired to be secured by Letters Patent is:

1. In an underwater storage vessel, for use in storing liquids having a specific gravity smaller than that of water and being substantially immiscible with water, in combination, an enclosure structure made of concrete sealed against the entry of water, and being operable to float and, respectively, to be submerged at rest below the water level and including ground engaging means for support at rest on the bottom of the body of water, conduit means connected to said structure and extending from the interior to the outside thereof and including valve means operable for the passage of fluids including pressurized air and said liquid and water, operable to control and to vary the ratio of water, liquid and air, and the pressure, on the interior of said structure and whereby said liquid and water may be filled into said structure and be stored in superposed direct contact therein and be discharged therefrom, said structure being elongated horizontally and comprising a roof section tapered downwardly conically from a central top portion including an apertured raised part above said top portion, said conduit means including hollow tubular elements extending upwardly from said structure beyond the level of the body of water surrounding said structure and operable to pass water, liquid, and air, said valve means comprising some elements for passage of air and of said liquid disposed above said level and respectively, other elements for water passage below said level, vertical perforated partitions disposed on the interior of said structure defining a series of intercommunicating storage chambers for water and liquid above the water and operable to restrain agitation of the water and liquid in said structure.

2. In a vessel as claimed in claim 1, said tubular elements projecting through the aperture of said top part and being sealed therein and extending into said chambers.

3. In a vessel as claimed in claim 1, the height of said partitions being in excess of the normal height of the water stored below said liquid on the interior of said structure.

References Cited in the file of this patent

UNITED STATES PATENTS

| | | |
|---|---|---|
| 1,201,051 | Jack | Oct. 10, 1916 |
| 1,312,356 | Reid | Aug. 5, 1919 |
| 2,337,472 | Kares | Dec. 21, 1943 |
| 2,371,404 | Mumford | Mar. 13, 1945 |
| 2,383,840 | Benckert | Aug. 28, 1945 |

FOREIGN PATENTS

| | | |
|---|---|---|
| 466,985 | Great Britain | June 9, 1937 |